Jan. 11, 1944.  A. ARNOT  2,339,132

HYDRAULIC REMOTE-CONTROL APPARATUS

Filed Nov. 23, 1942

INVENTOR
Alfred Arnot
By Watson, Cole, Grindle & Watson
ATTYS

Patented Jan. 11, 1944

2,339,132

UNITED STATES PATENT OFFICE 2,339,132

HYDRAULIC REMOTE-CONTROL APPARATUS

Alfred Arnot, Warrington, England, assignor to Associated Messier Investments Limited, Farnham Common, Buckinghamshire, England, a British company Application November 23, 1942, Serial No. 466,639
In Great Britain December 1, 1941

5 Claims. (Cl. 60—54.5)

The present invention comprises improvements in or relating to hydraulic remote control apparatus.

It is well known to transmit movement from an operating member to another member which is required to follow the movements of the operating member by means of a hydraulic transmission system in which a liquid under pressure is acted upon by a piston or pistons under the control of the actuating member, and the pressure liquid is conveyed by a pipe or pipes to a receiving station where a piston or pistons are provided in contact with the liquid under pressure and operatively connected to the member whose movement is to follow that of the actuating member. When there are a plurality of pistons at the transmitting station connected by a plurality of pipes to a similar number of pistons at the receiving station the movements of the actuated member at the receiving station can be made completely positive and the present invention relates to apparatus of this latter type. One of the main problems encountered in such positively-acting apparatus is that of compensating for expansion or contraction of the liquid employed as the transmitting medium and it is an object of the invention to deal with this difficulty. It is furthermore desirable to provide means for compensating the losses due to leaks. If a single piston and cylinder is employed at each end of the transmission only a single pipe is required but in that case the receiving member has to be spring-returned and the present invention is not applicable to such single-pipe controls. Although the invention is herein described as applied to two-pipe controls it is also applicable to controls with more than two pipes such, for example as that described in United States patent application of H. G. Conway, Serial No. 436,909.

The present invention comprises in hydraulic remote-control apparatus of the kind described, the provision of a thermal-expansion device comprising an expansion chamber in communication with each transmission pipe, a movable expansion-member (piston or equivalent) in each chamber, the movable expansion members being operatively connected by irreversible gearing so that while they can yield together under pressure due to thermal expansion, they restrain one another against movement under working pressure applied differentially to the pipes.

The effect of the irreversible gearing is that differential pressure on the expansion members will cause locking of the gearing, and only if the members are simultaneously subjected to pressure, as occurs in the case where an expansion due to the change of temperature takes place, can they yield.

The following is a description, by way of example, of one form of apparatus in accordance with the invention, but it is to be understood that the invention is not limited to the particular embodiment described:

In the accompanying drawing.

Figure 1:
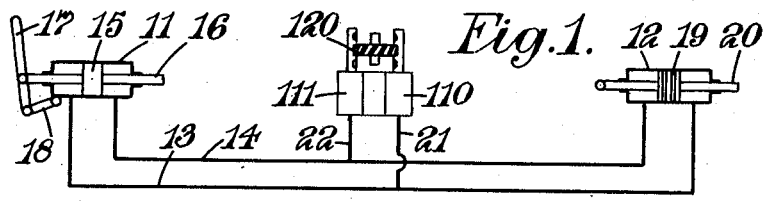
Figure 1 is a diagrammatic representation of a remote-control apparatus embodying a thermal expansion device in accordance with the invention.
Figure 2:
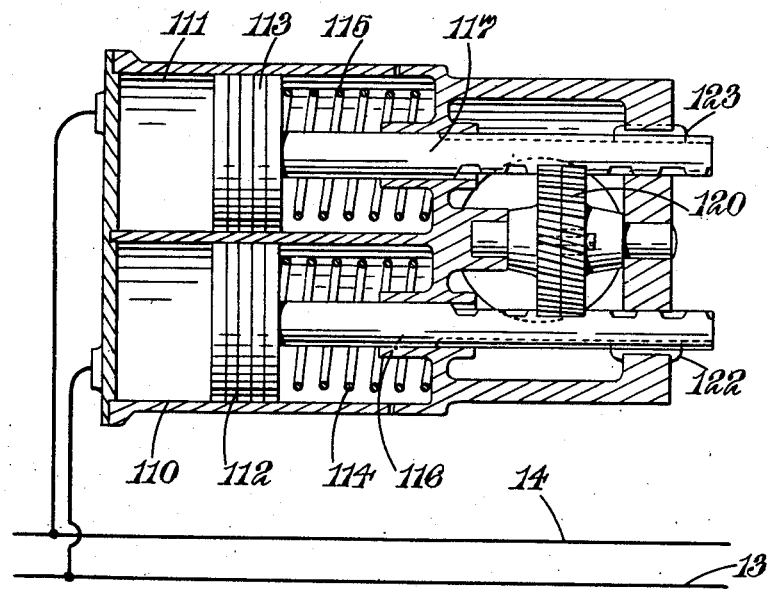
Figure 2 is a diagrammatic longitudinal section through the thermal expansion device.

Referring to Figure 1, the transmission system comprises a transmitter 11 and a receiver 12 each consisting of a cylinder closed at both ends, one end of each cylinder being connected to a transmission pipe 13 and the other end to a transmission pipe 14. The transmission pipes interconnect the ends of the transmitter cylinder to the corresponding ends of the receiver cylinder and may be of any suitable length. In the transmitter cylinder 11 there works a piston 15 mounted on a piston rod 16 and operated by a lever 17 which is connected to the cylinder 11 by a link 18.

At the receiver 12 the cylinder contains a piston 19 mounted on a piston rod 20 the movements of which copy the movements of the piston rod 16 at the transmitting station.

Branches 21, 22 from the pipes 13, 14 respectively are connected to expansion chambers 110, 111 formed as two parallel cylinders side by side. The cylinders constitute part of the thermal expansion device now to be described.

The two expansion cylinders 110, 111 each contains a piston 112, 113 which is yieldingly returned by a light spring 114, 115. The pistons carry piston rods 116, 117 which are provided with inclined rack teeth 118, 119 meshing with a skewed-tooth gear-wheel 120, which has an axis parallel to the piston rods. The piston rods are splined and guided by keys 122, 123 and back-lash may be minimised by making the gear-wheel 120 in two parts, circumferentially adjustable relatively to one another, so that their teeth may be set slightly out of register. The angle of the skewed-tooth is such that the piston rods can drive the gear-wheel but the gear-wheel cannot drive the piston rods. Thus the connection is irreversible and pressure on one piston only will lock the gear but equal action on both piston rods will turn the gear-wheel and permit expansion or contraction to take place. It follows that the equal action produced by changes of temperature can be compensated freely while yielding to the differential pressure produced by action of the transmitter is prevented by the irreversibility of the gear 120.

Figure 3:
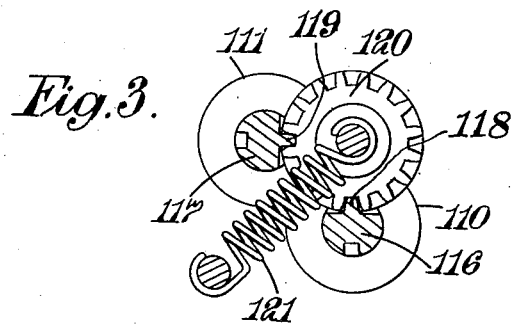
Figure 3 is a cross-section through a modified device.

It is not necessary that the piston rods 116, 117 should engage the gear-wheel 120 at diametrically opposite points. For example, as viewed in section, across the axis of the gear-wheel the two piston rods may be disposed at an angle of 90° to one another, as shown in Figure 3 and in this case if the gear-wheel is drawn firmly into mesh with both the racks by diagonal springs 121, back-lash will be obviated.

It will be noted that in this temperature compensating device the mechanism is self-locking against the differential pressure produced by operation of the transmitter lever 17. In certain devices the system is subject to an initial pressure which constitutes a limitation on the working pressure but it is not necessary that any high initial pressure should be present in the system according to the present invention and therefore the springs 114, 115 may be relatively light ones, only strong enough to overcome the friction of the parts.

I claim:

1. In hydraulic remote-control apparatus of the kind described, which comprises a transmitter, a receiver, and a plurality of transmission pipes connecting said transmitter and receiver, the provision of a thermal-expansion device comprising an expansion chamber in communication with each transmission pipe, a movable member in each chamber, the movable members being operatively connected by irreversible gearing so that while they can yield together under pressure due to thermal expansion, they restrain one another against movement under working pressure applied differentially to the pipes.

2. In hydraulic remote-control apparatus the combination of a transmitter comprising piston means for causing an outflow from and an inflow to the transmitter of hydraulic fluid, a receiver comprising piston means movable under the influence of an inflow of liquid to the receiver and an outlet of liquid therefrom, a plurality of pipes interconnecting the transmitter and receiver to convey the said outflow and inflow of liquid from the transmitter to the receiver, branches from the said pipes to expansion cylinders allocated one to each pipe, pistons in said expansion cylinders and irreversible gearing connecting the said pistons together such that simultaneous pressure on all the pistons will effect movement thereof but differential pressure on the pistons will lock the gearing.

3. A hydraulic remote-control system as claimed in claim 2, wherein the expansion cylinders are disposed close together and parallel with one another and the irreversible gearing consists of skew-rack teeth carried by the pistons and a skewed-tooth gear-wheel mounted upon an axis parallel to the direction of movement of the pistons and located between the rack teeth so as to mesh therewith and interconnect the pistons.

4. A thermal expansion device for a hydraulic remote-control system comprising in combination two parallel cylinders close together, pistons in said cylinders, piston rods on the pistons, skew-rack teeth cut on the piston rods, a skewed-tooth gear-wheel located between the piston rods so as to mesh with said rack teeth, return springs for biasing the pistons in the cylinder towards one end thereof and a hydraulic connection to each cylinder opening into the end of the cylinder towards which the pistons are urged by the springs.

5. A thermal expansion device as claimed in claim 4, wherein the skewed-tooth gear-wheel and the piston rods are so located relatively to one another that the rack teeth engage the gear-wheel at points on the circumference thereof situated less than 180° apart and wherein resilient means are provided to press the gear-wheel laterally towards the rack teeth so as to reduce back-lash.

ALFRED ARNOT.